(12) United States Patent
Rattunde

(10) Patent No.: US 11,099,011 B2
(45) Date of Patent: Aug. 24, 2021

(54) MEASUREMENT OF MATERIAL DIMENSIONS

(71) Applicant: RATTUNDE & CO GMBH, Ludwigslust (DE)

(72) Inventor: Ulrich Rattunde, Bentwisch (DE)

(73) Assignee: Rattunde AG, Ludwigslust (DE)

( * ) Notice: Subject to any disclaimer, the term of this patent is extended or adjusted under 35 U.S.C. 154(b) by 87 days.

(21) Appl. No.: 15/529,556

(22) PCT Filed: Nov. 24, 2015

(86) PCT No.: PCT/EP2015/077551
§ 371 (c)(1),
(2) Date: May 25, 2017

(87) PCT Pub. No.: WO2016/083406
PCT Pub. Date: Jun. 2, 2016

(65) Prior Publication Data
US 2017/0343344 A1 Nov. 30, 2017

(30) Foreign Application Priority Data

Nov. 25, 2014 (DE) .......................... 102014117255.8

(51) Int. Cl.
*G01B 21/20* (2006.01)
*B23D 59/00* (2006.01)
(Continued)

(52) U.S. Cl.
CPC ............. *G01B 21/20* (2013.01); *B23D 45/12* (2013.01); *B23D 47/02* (2013.01); *B23D 59/001* (2013.01);
(Continued)

(58) Field of Classification Search
CPC ........ G01B 21/02; G01B 21/04; G01B 21/08; G01B 21/10; G01B 21/12; G01B 21/14;
(Continued)

(56) References Cited

U.S. PATENT DOCUMENTS 4,091,698 A * 5/1978 Obear .................... B23D 47/10
83/34
4,330,835 A * 5/1982 Gehm .................... G01B 15/00
348/135

(Continued)

FOREIGN PATENT DOCUMENTS

AT          334168 B       1/1976
DE         2934389 A1      3/1981
(Continued)

*Primary Examiner* — Laura M Lee
(74) *Attorney, Agent, or Firm* — Bay State IP, LLC

(57) ABSTRACT

The invention relates to a method for determining material dimensions of a longitudinal profiled section (2) during a sawing process, in which a saw blade (3) is advanced, the longitudinal profiled section (2) being machined by said saw blade (3) along a saw groove during this time; advancement position data of said saw blade (3) along the advancement path (s) being determined and, during this sawing operation, (Continued)

Figure 1:
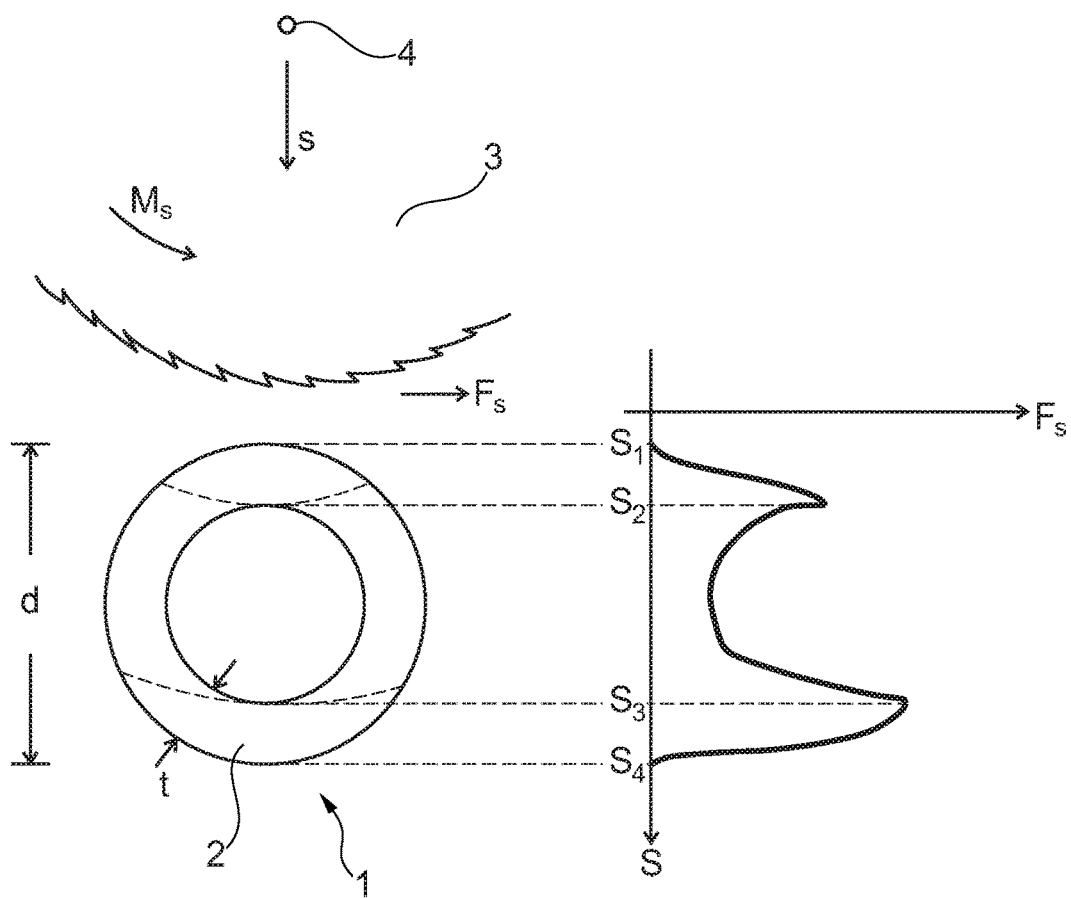

additional measurement data being determined from the group of sawing force ($F_s$) or another variable which corresponds to the sawing force ($F_s$). The invention is characterised in that an actual profile is determined from the advancement position data and said additional measurement data.

5 Claims, 2 Drawing Sheets

(51) Int. Cl.
*G01B 21/08* (2006.01)
*G01B 21/10* (2006.01)
*B23D 45/12* (2006.01)
*B23D 47/02* (2006.01)
*G01L 5/00* (2006.01)

(52) U.S. Cl.
CPC ............ *B23D 59/008* (2013.01); *G01B 21/08* (2013.01); *G01B 21/10* (2013.01); *G01L 5/0028* (2013.01); *Y10T 83/178* (2015.04); *Y10T 83/18* (2015.04)

(58) Field of Classification Search
CPC .......... G01B 21/20; G01B 11/08; G01B 5/08; G01B 13/10; G01B 13/12; G01B 13/14; G01B 13/21; B23D 45/12–128; B23D 51/20; B23D 59/001; B23D 59/002; Y10T 83/7139; Y10T 83/7151; Y10T 83/0495; Y10T 83/175; Y10T 83/7076

USPC ...... 702/157; 83/73, 522.13, 522.17, 522.26, 83/33, 76.7, 789
See application file for complete search history.

(56) References Cited

U.S. PATENT DOCUMENTS

| | | | | | |
|---|---|---|---|---|---|
| 4,432,260 | A | * | 2/1984 | Sarurai | B23D 55/088 83/13 |
| 4,695,729 | A | * | 9/1987 | Monno | G01N 23/16 250/358.1 |
| 4,964,021 | A | * | 10/1990 | Masin | F21S 43/00 362/538 |
| 5,043,907 | A | * | 8/1991 | Richards | B23D 55/088 700/167 |
| 5,208,760 | A | * | 5/1993 | Moriya | B23D 55/086 700/192 |
| 6,377,654 | B1 | * | 4/2002 | Willems | G01B 15/025 250/358.1 |
| 6,993,435 | B2 | * | 1/2006 | Schittl | B23D 59/001 702/157 |
| 2013/0340892 | A1 | * | 12/2013 | Parker | G01N 29/045 144/356 |
| 2014/0360322 | A1 | * | 12/2014 | Oberle | B23D 55/088 83/13 |

FOREIGN PATENT DOCUMENTS

| | | |
|---|---|---|
| EP | 0638370 A1 | 2/1995 |
| EP | 1072861 A1 | 1/2001 |
| GB | 1078505 A | 8/1967 |

\* cited by examiner

MEASUREMENT OF MATERIAL DIMENSIONS

CROSS REFERENCE TO RELATED APPLICATION

This application is for entry into the U.S. National Phase under § 371 for International Application No. PCT/EP2015/077551 having an international filing date of Nov. 24, 2015, and from which priority is claimed under all applicable sections of Title 35 of the United States Code including, but not limited to, Sections 120, 363, and 365(c), and which in turn claims priority under 35 USC 119 to German Patent Application No. 10 2014 117 255.8 filed on Nov. 25, 2014.

The invention relates to a method for determining material dimensions of an elongate profile during a sawing process, in which a saw blade is fed forward, in the course of which an elongate profile is cut by the saw blade along a saw groove, feed position data of the saw blade is determined along the feed path, and further measurement data selected from the group consistent of sawing force or another variable that corresponds to the sawing force is determined.

Tube cutting machines are sufficiently known from the prior art. Due to increasing requirements in respect of the accuracy of the dimensions of the tube sections cut to length, the latter are subjected to verification. The tube sections cut to length are subjected to verification with regard to length for example by the tube cutting machine of DE 10 2005 025 606, or with regard to the shape of the profile of the tube edge by a device of DE 10 2006 019 354.

DE 10 2013 202 754 A1 discloses a device for separating the workpiece along a separation line. In the course of this, the machining process is simplified for the user by calculating, using a sensor unit, a current machining result on the basis of the measured values, and the current machining result is shown on a display device.

What is of disadvantage on the tube cutting machine mentioned is that a check of the dimensions of the tube inserted in the tube cutting machine, in particular the diameter and the wall thickness thereof, is possible only at great expense. In particular, different types of tube to be cut to length may be partially very close to each other in respect of their diameter and their wall thickness, i.e. the difference between various tube diameters may only be a few tenths of a millimetre and also the wall thicknesses of various tube types may deviate from each other only by a few tenths of a millimetre, so that they cannot be distinguished from each other with the naked eye. This is a problem especially in the case of incorrectly identified tubes.

It may sometimes be impossible to detect an error in the selection or a mixing up of tube types or same tube dimensions made from a different material.

It is therefore the object of the present invention to provide a method that allows a check of material dimensions to be carried out even during the sawing process.

The object is achieved by means of a method mentioned at the beginning, which has the characterising features of claim 1. Elongate profiles are understood to be solid profiles but also tubes, in particular however metal profiles.

According to the invention, an actual profile is determined on the basis of feed position data available on controlled tube cutting machines, i.e. the location coordinates of the saw blade shaft of the saw blade and further measurement data.

Further measurement data will preferably be the sawing force or another variable that corresponds to the sawing force, in particular the torque. The actual profile constitutes for example the course of the sawing force as a function of the feed path.

Preferably, an error in the material dimensions is detected by comparing the actual profile with a target profile under consideration of an admissible specified tolerance, or material dimensions are directly determined by evaluating the actual profile, preferably independently from the decreasing height or diameter of the sawing blade due to wear.

In particular, the elongate profile sections are tube sections, in particular tube sections of metal tubes, and the material dimensions are the diameter of the wall thickness of the tube section.

The saw blade is preferably a circular saw blade that is rotated, and feed position data of a saw blade shaft is measured along the feed path of the saw blade. In the course of this, the location coordinates of the saw blade shaft are preferably determined at different measurement points closely following each other. In the case of the usually used controlled tube cutting machines, this data is available anyway and in a readily determinable manner. In particular, the location coordinates of the saw blade shaft are determined with reference to a receptacle for the elongate profile section, in particular in proportion to the bottom support surface of the receptacle.

Advantageously, extremal values are determined from the actual profile, and the material dimensions are determined from the feed position data of the extremal values.

It has been shown that initially, in a simple manner, the feed position data of the start of the cutting process and of the end of the cutting process can be determined from the actual profile of the sawing process, for example of a tube. The start of the cutting process corresponds to the increase of the further measured value, in particular the sawing force, from the zero value, whereas the end of the cutting process corresponds to the decrease of the further measured value down to the zero value. From the difference between the two feed position data, a diameter of the elongate profile may be determined. The part of the sawing process between the initial penetration of one of the saw teeth into the elongate process and the severing of the elongate profile is referred to as the cutting process.

In a particularly preferred embodiment of the invention, material dimensions of the elongate profile may be determined from the difference between the feed position data of two adjacent maximum values.

Advantageously, a wall thickness of the elongate profile, in particular of a tube, is determined from the difference between the feed position data of the start of the cutting process and the feed position data of a first maximum value and/or from the difference between the feed position data of the end of the cutting process and the feed position data of a second maximum value.

The method according to the invention is particularly suitable for application to tubular elongate profile sections with a circular inner and a circular outer diameter. Preferably, the elongate profiles, to which the method is applied, are disposed around a longitudinal axis in a rotationally symmetrical manner.

In a further preferred embodiment of the invention, the feed position data of the start of the cutting process is determined, and from this, a saw blade diameter is determined.

In a further embodiment of the invention, the tensile strength of the material is determined from the further measurement data, in particular the sawing force or the torque, or a torque-lifetime profile is determined, which is compared with stored target profiles of a torque lifetime, and from deviations above a specified tolerance, a conclusion can be made in respect of a wrong material of the elongate profile.

Figure 2:
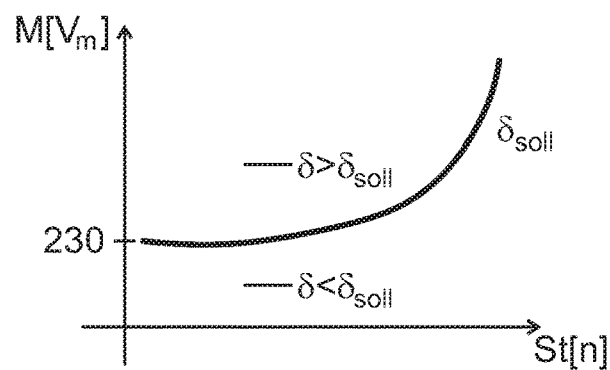
Figure 3:
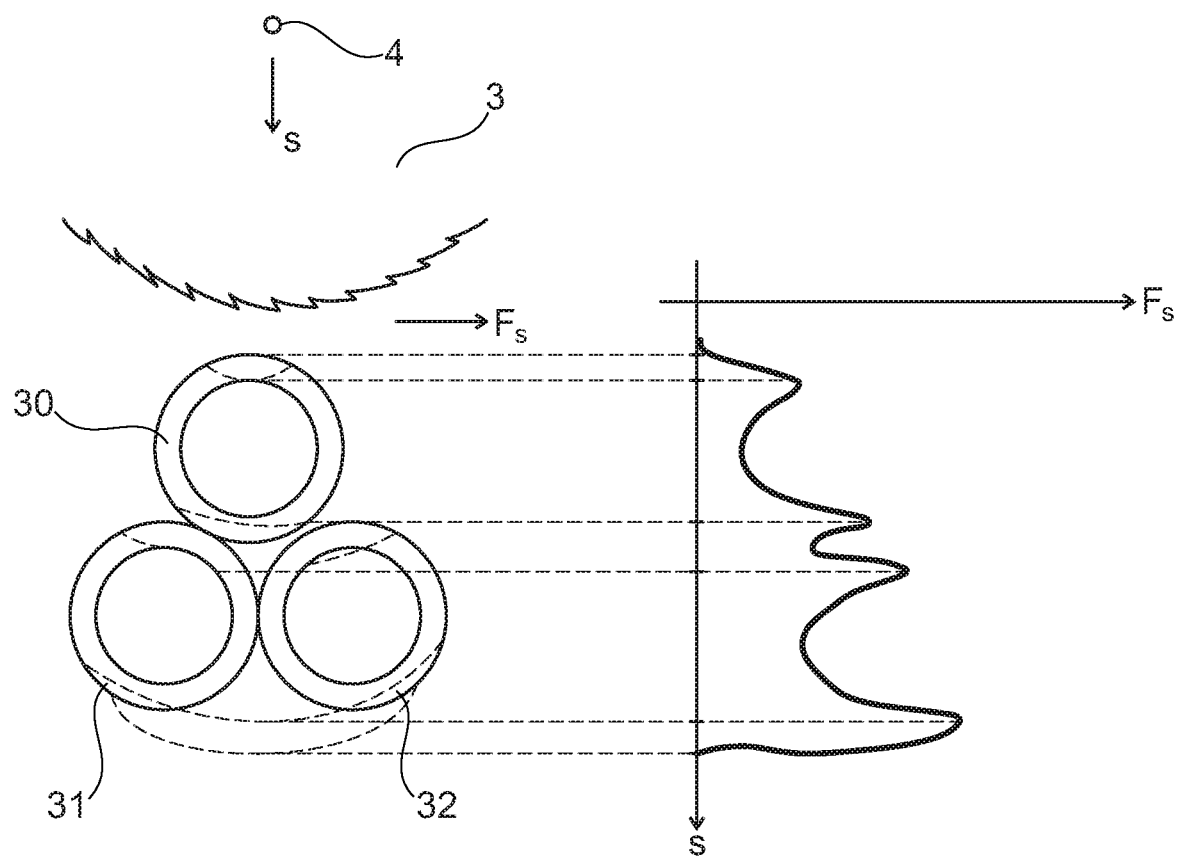

The invention will now be described by means of two embodiment examples in three figures, wherein:

FIG. 1 shows a schematic view of a tube section that is cut by a rotating saw blade, and of a feed/sawing force profile generated during the cutting process, FIG. 2 shows a graphic representation of a torque of the saw blade as a function of the lifetime thereof during a specified same engagement length, using three materials with different tensile strengths, FIG. 3 shows a schematic view corresponding to FIG. 1 with three stacked tube sections.

FIG. 1 shows a schematic view of a receptacle 1 of a tube 2 inserted into the tube cutting machine, from which a tube section 5 is to be cut off by means of a rotating saw blade 3. The tube is here a metal tube that consists only of the metal. In FIG. 1, the saw blade 3 rotates in the counter-clockwise direction. The direction of rotation is indicated by a curved arrow. The saw blade 3 is not shown completely but as a segment around a saw blade shaft 4. During the sawing process, the tube 3 is cut along a saw surface orientated perpendicularly to a longitudinal direction L of the tube 2. The saw blade 3 is moved along a feed path s relative to the tube. In the course of this, the feed path s of the saw blade shaft 4 is aligned with a longitudinal axis of the tube 2. In FIG. 1, the saw blade 3 is fed from the top towards the bottom.

During the sawing process, a torque $M_s$ acting on the saw blade shaft 4 or a sawing force $F_s$ acting on the cutting surface is measured. The sawing process is carried out by means of a CNC controller of the tube cutting machine, so that the position of the saw blade shaft 4 relative to the receptacle 1 of the tube can be continuously determined and feed position data is determined along the feed path s. In FIG. 1, the feed position data of the saw blade shaft 4 is determined and the sawing force $F_s$ is determined and stored. They are graphically shown in FIG. 1 in the form of a feed/sawing force profile.

The feed-sawing force profile is shown in FIG. 1 to the right next to a cross-section of the tube 2. The sawing force measurement data determined with regard to certain feed position data may be measured for closely adjacent feed position data. The determined feed-sawing force measurement data may be linked together to form a continuous curve according to FIG. 1 using conventional interpolation methods.

FIG. 1 shows an actual profile determined in this way. The actual profile is evaluated.

The actual profile of FIG. 1 shows an increase of the sawing force Fs starting from a zero value immediately before the start of the cutting process of the method. The sawing force Fs rises up to a point at which a maximum engagement length, indicated by an upper dashed line along the cross-section of the tube 2, of the saw blade 3 into the tube 2 has been reached. An engagement length is here understood to be a length of a sectional line of the saw blade 3 in a saw groove generated by the cutting process.

Starting from a first maximum of the engagement length, the sawing force $F_s$ decreases with the increasing feed path s initially due to the decreasing engagement length, in order to rise again up to a second maximum value which is even higher than the first maximum value. The second maximum engagement length is shown in FIG. 1 by a second dashed line located below the first line. The second maximum value is higher than the first maximum value because the second maximum engagement length along the second dashed line is longer than the first engagement length drawn.

As the saw blade 3 is continued to be fed forward, the sawing force $F_s$ decreases again and drops, after the cutting off is completed at the end of the cutting process of the tube 3, down to a zero value.

From the determined difference between the feed position data at the start of the cutting process $s_1$ and the feed position data of the first maximum value $s_2$, a conclusion in relation to the wall thickness t of the tube 2 can be made by forming the difference $t=s_2-s_1$. Further, by finding the difference $t=s_4-s_3$ from feed position data of the second maximum value $s_3$ and feed position data of the end of the cutting process $s_4$, a conclusion with regard to the wall thickness t of the tube 2 can also be made.

By finding the difference $d=s_4-s_1$, a conclusion with regard to a diameter d of the tube can be made from the feed position data of the end of the cutting process $s_4$ and that of the beginning of the cutting process $s_1$. Therefore, the feed/sawing force profile determined in FIG. 1 allows the diameter d and the wall thickness t of the tube 2 in FIG. 1 to be determined.

The tube cutting machine not shown in FIG. 1 may have a database having deposited therein different types of target profiles which are associated with tubes of different diameters and of different wall thicknesses. Prior to the start of the sawing process, the diameter and the wall thickness of the tube 2 to be machined are input, and the associated target profile is determined in the database. The target profile is compared with the determined actual profile in FIG. 1 either after or during the cutting process of the tube 2, and in the case of any deviations that are above a predefined tolerance, a warning signal is output so as to alert the operating personnel that a tube with a wrong diameter d and/or a wrong wall thickness t has been inserted into the tube cutting machine, from which a tube section has been cut off.

The deciding factor is the profile of the characteristic curve, which serves as a kind of fingerprint of the tube. The profile of the actual characteristic curve is compared with the profile of the target characteristic curve. In the case of deviations that are above a tolerance, a signal is output.

The tolerance is selected such that any manufacturing inaccuracies of the tubes 2 of one type will not be sensed but dimensional differences between the types of tubes will. A tube type is to be understood to be the amount of tubes that have, with the exception of any manufacturing inaccuracies, the same diameter d and the same wall thickness t and the same material.

The tube diameters d of different types of tubes 2 as well as the wall thicknesses t are so close together that they cannot be detected with the naked eye. Using the control procedure it can be retrospectively determined whether a wrong tube type has been inserted.

In a further aspect, in addition to or instead of the profile determined in FIG. 1, a torque-lifetime profile according to FIG. 2 may be determined. The lifetime St is here defined as the number of sawing processes carried out by the saw blade 3. Usually, in the case of a new saw blade 3 with sharp teeth, the torque $M_s$ will be substantially constant during the initial cutting processes. In the present case, the torque $M_s$ is approximately 230 Nm. As the lifetime St increases, the saw blade 3 will become increasingly blunt and will progressively degrade starting from a certain lifetime St.

The torque $M_s$ to be applied during the sawing process is on the one hand a function of the sharpness of the teeth, but on the other hand also a function of the material characteristics of the tube 2. In particular, different steel types have different tensile strengths σ in the different alloys, which require different torques $M_s$ during the sawing process. The terms tensile strength and machinability are here used synonymously. If the tensile strength σ is above a target tensile strength $\sigma_{soil}$, the torque $M_s$ to be applied according to FIG. 2 will be markedly higher at the same engagement length, whereas in the case of materials having a lower tensile strength, the torque $M_s$ to be applied for the machining process will be lower. The method also allows the type of material from which the tube 2 is made to be input into the control of the tube cutting machine. From the deviation, which is again above the corresponding manufacturing tolerances, of the actual curve from the target curve in FIG. 2, it can be concluded that a tube with a wrong material has been selected. In FIG. 2, the characteristic curve shows a jump in the case of a change to the tensile strength σ from $\sigma<\sigma_{soil}$ to $\sigma>\sigma_{soil}$. A comparison has been deposited in the database for certain materials and in connection with the tube diameter and the wall thickness, lifetime profiles have been deposited. The various target profiles are also deposited in the database.

If the actual profile determined deviates from the target profile by more than the specified tolerance, a warning signal is again output so as to inform the operating personnel that a tube 2 with a wrong material has been inserted into the tube cutting machine.

FIG. 3 shows the arrangement in FIG. 1 with three stacked tubes 30, 31, 32, from which a tube section 5 has in each case been cut off at the same time. The associated feed-sawing force profile is shown in FIG. 3 at the bottom right. From this profile, a conclusion can be made with regard to the diameter d and the wall thickness t of the tubes 30, 31, 32 in the same manner as in FIG. 1.

LIST OF REFERENCE NUMERALS

1 Receptacle
2 Tube
3 Saw blade
4 Saw blade shaft
5 Tube section
30 Stacked tube
31 Stacked tube
32 Stacked tube
L
$F_s$ Sawing force
$M_s$ Torque
St Lifetime
d Diameter
s Feed path
$s_1$ Feed position data start of the cutting process
$s_2$ Feed position data of the first maximum value
$s_3$ Feed position data of the second maximum value
$s_4$ Feed position data end of the cutting process
t Wall thickness
σ Tensile strength
$\sigma_{soil}$ Target tensile strength

The invention claimed is:

1. A method for determining material dimensions of a tube (2) during a sawing process with a tube cutting machine, wherein
  a circular saw blade (3) is fed forward,
  the tube (2) is, in the course of feeding the circular saw forward, cut by the circular saw blade (3) along a saw groove;
  feed position data ($s_1$, $s_2$, $s_3$, $s_4$) of the circular saw blade (3) is determined along a feed path (s) of the circular saw blade,
  during the sawing process, further measurement data from the group of sawing force ($F_s$) or another variable ($M_s$) that corresponds to the sawing force ($F_s$) is determined,
  characterised in that
  an actual profile of the tube is determined from the feed position data ($s_1$, $s_2$, $s_3$, $s_4$);
  the further measurement data ($F_s$, $M_s$) along with the diameter and the thickness of the tube (2) to be machined are input into the tube cutting machine;
  target profile associated with the diameter and wall thickness input is determined in a database;
  the target profile is compared with the actual profile and in case of any deviations that are above a predefined tolerance, a warning signal is output; and
  extremal values are determined from the actual profile and the material dimensions are determined from the feed position data ($s_1$, $s_2$, $s_3$, $s_4$) of the extremal values;
  wherein a wall thickness (t) of the tube (2) is determined from the difference between the feed position data of the start of the cutting process ($s_1$) and the feed position data of a first maximum value ($s_2$).

2. The method as claimed in claim 1, characterised in that the circular saw blade (3) is rotated and feed position data of a saw blade shaft (4) is measured along the feed path (s).

3. The method as claimed in claim 1, characterised in that material dimensions of the tube are determined from the difference between the feed position data ($s_1$, $s_2$, $s_3$, $s_4$) of two adjacent extremal values.

4. The method as claimed in claim 3, characterised in that a diameter (d) of the tube (2) is determined from the difference between the feed position data of the end of the cutting process ($s_4$) and the feed position data of the start of the cutting process ($s_1$).

5. The method as claimed in claim 1, characterised in that the tube (2) with a circular inner and a circular outer diameter is selected for further processing.

* * * * *